Patented Jan. 2, 1934

1,941,601

UNITED STATES PATENT OFFICE 1,941,601

SEPARATION OF OIL AND WAX

Seymour W. Ferris, Lansdowne, Pa., assignor to The Atlantic Refining Company, Philadelphia, Pa., a corporation of Pennsylvania No Drawing. Application January 10, 1931
Serial No. 508,006

4 Claims. (Cl. 196—19)

The present invention relates to the art of refining hydrocarbon oils, and has particular reference to the separation of oil and wax from mixtures containing the same.

In my copending application Serial Number 206,388, filed July 16, 1927, which on January 13, 1931, issued into Patent No. 1,788,569, of which the present application is a continuation in part, there is described and claimed a process for separating hydrocarbon oils, such as the viscous fractions of petroleum, into fractions which are respectively more paraffinic and more naphthenic than the original fraction by fractional extraction with nitrobenzene.

The present invention particularly concerns a process by which mixtures of wax and oil are separated more readily than has been possible heretofore.

I have found, as indicated in my aforesaid copending application, that the separation of oil and wax mixtures is expedited by preceding the customary separation methods, cold settling, for example, by extraction of the oil-wax mixture with nitrobenzene.

For brevity, my invention will be described with reference to treatment of an oil-wax mixture with nitrobenzene prior to separation of the oil and wax by the well known cold settling process, but it is to be understood that my invention is operable in connection with other oil and wax separation methods, for example, with methods in which separation is effected by centrifugal force.

The oil-wax mixture or fraction to be treated is mixed with a suitable proportion of nitrobenzene, for example, with an equal volume of nitrobenzene, at temperatures sufficiently high to obtain a homogeneous liquid. This liquid is then cooled to produce a two-layer system, in which the lower layer comprises a nitrobenzene dissolved fraction which is more naphthenic than the original oil-wax mixture, and the upper layer comprises a nitrobenzene undissolved fraction which is more paraffinic than the original oil-wax mixture and which contains the wax constituents of said mixture. The layers are separated and freed from nitrobenzene by vacuum distillation. Instead of this heating and cooling to effect the extraction, I may simply agitate a cold mixture of nitrobenzene and the oil-wax mixture.

The amount of nitrobenzene to be employed will depend upon such factors as the character of the oil-wax mixture and operating conditions. In place of a single extraction, several such treatments may be advantageous in many instances.

After the nitrobenzene extraction, the oil-wax mixture is subject to the cold settling process. That is, the mixture is diluted with naphtha in an amount which will depend upon factors known to the art, but which may be, for example, 70% of the diluted mixture. The diluted mixture is then cooled somewhat slowly to a temperature sufficiently low to cause solidification of the wax content thereof, which temperature may be, for example, 0° F. This mixture is allowed to stand in heat insulated tanks until the solidified wax settles out of admixture with the liquid constituents of the mixture. The clear supernatant liquid is then decanted, and the naphtha removed from both portions by distillation, thereby completing the separation of oil and wax.

In the ordinary cold settling process, the time required for one cycle of operation and the efficiency of wax separation from the oil will vary considerably with different stocks and the temperature at which settling is effected. A Mid-Continent wax distillate in 30-70 solution with naphtha and cooled to 0° F. will ordinarily require approximately 125 hours for settling, and will produce an oil having a pour test of 30° F. I have found that by preceding the cold settling with nitrobenzene, the oil resulting from cold settling under similar conditions will have a lower pour test, for example, from 15-20° F. Also, the time required for settling is reduced considerably, and an oil of low wax content obtained. I am unable to adequately explain the novel effect which results from preceding separation of wax and oil by extraction with nitrobenzene. Apparently, the nitrobenzene extraction has a conditioning effect upon the wax which renders it more readily separable from the oil. Regardless of theory, however, I have found that the separation is more satisfactory when effected in accordance with my invention.

While my process is described somewhat specifically it is intended to include such modifications as come within the spirit of my invention as defined by the appended claims. For example, it may be found advantageous in certain cases to omit removing all the nitrobenzene from the oil-wax mixture after the extraction step.

What I claim is:—

1. The process of separating wax and oil from a mixture containing the same, which comprises extracting the oil-wax mixture with nitrobenzene, and then separating the wax from the oil which remains in the undissolved portion of said mixture after the extraction.

2. The process of separating wax and oil from a mixture containing the same, which comprises extracting the oil-wax mixture with nitrobenzene, diluting the undissolved portion of said mixture with naphtha, cooling such portion to a temperature sufficiently low to cause at least a portion of its wax content to solidify, and separating the solidified wax from the constituents which remain liquid.

3. The process of separating wax and oil from a mixture containing the same, which comprises extracting the oil-wax mixture with nitrobenzene, removing residual portions of nitrobenzene from the undissolved portion of the mixture, diluting the undissolved portion with naphtha, cooling the diluted portion to a temperature sufficiently low to cause solidification of at least a portion of the wax content thereof, and separating the solidified wax from the constituents which remain liquid by cold settling.

4. The process of separating wax and oil from a mixture containing the same, which comprises extracting the oil-wax mixture with nitrobenzene, removing residual portions of nitrobenzene from the undissolved portion of the mixture, diluting the undissolved portion with naphtha, cooling the diluted portion to a temperature sufficiently low to cause solidification of at least a portion of the wax content thereof, and separating the solidified wax from the constituents which remain liquid by centrifuging.

SEYMOUR W. FERRIS.